Jan. 24, 1961

W. J. FRIESEN 2,969,043

POWER CONTROL APPARATUS

Filed March 18, 1959

INVENTOR.
WILMER J. FRIESEN

BY

Kenneth M. Thorpe
atty.

Jan. 24, 1961 W. J. FRIESEN 2,969,043
POWER CONTROL APPARATUS
Filed March 18, 1959 2 Sheets-Sheet 2
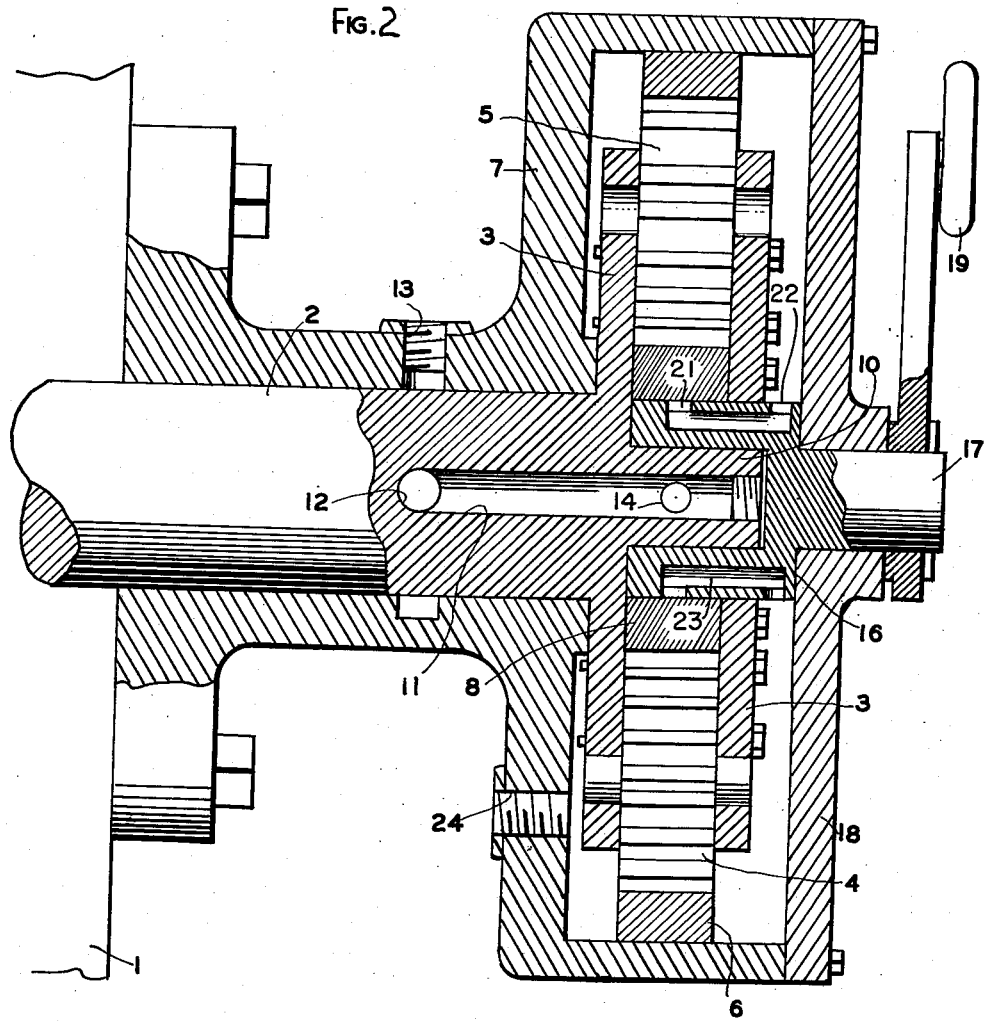
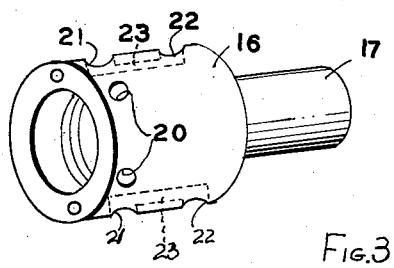
INVENTOR.
WILMER J. FRIESEN
BY
Kenneth M. Thorpe
atty.

United States Patent Office

2,969,043
Patented Jan. 24, 1961

2,969,043
POWER CONTROL APPARATUS

Wilmer J. Friesen, 1016 W. 2nd St., Hutchinson, Kans.

Filed Mar. 18, 1959, Ser. No. 800,287

3 Claims. (Cl. 121—39)

This invention relates to power increasing controls whereby relatively small or finger tip manual power or movement of a control may be followed or traced by power increasing means to effect control or movement of heavy loads. The device may be used in combination with any apparatus, power steering, machine shop equipment, cranes, motors, agricultural or earth moving implements, and the like.

One of the objects of the invention is to produce a control device of such nature that the power increasing movement is in exact accord with the degree of movement given to the control without over-run or backlash.

Another object is to produce a control device of such nature that it has automatic correction characteristics, in other words, it will close or shut itself off unless it is intentionally held in open position.

With the general objects named in view and others as will hereinafter appear the invention consists in certain new and useful features of construction and combination of parts as hereinafter described and claimed; and in order that it may be fully understood, reference is to be had to the accompanying drawings, in which:

Figure 2 is a section on the line II—II of Figure 1, turned at an angle of 180° for convenience.

Figure 3 is a perspective view of the control valve.

Figure 1:
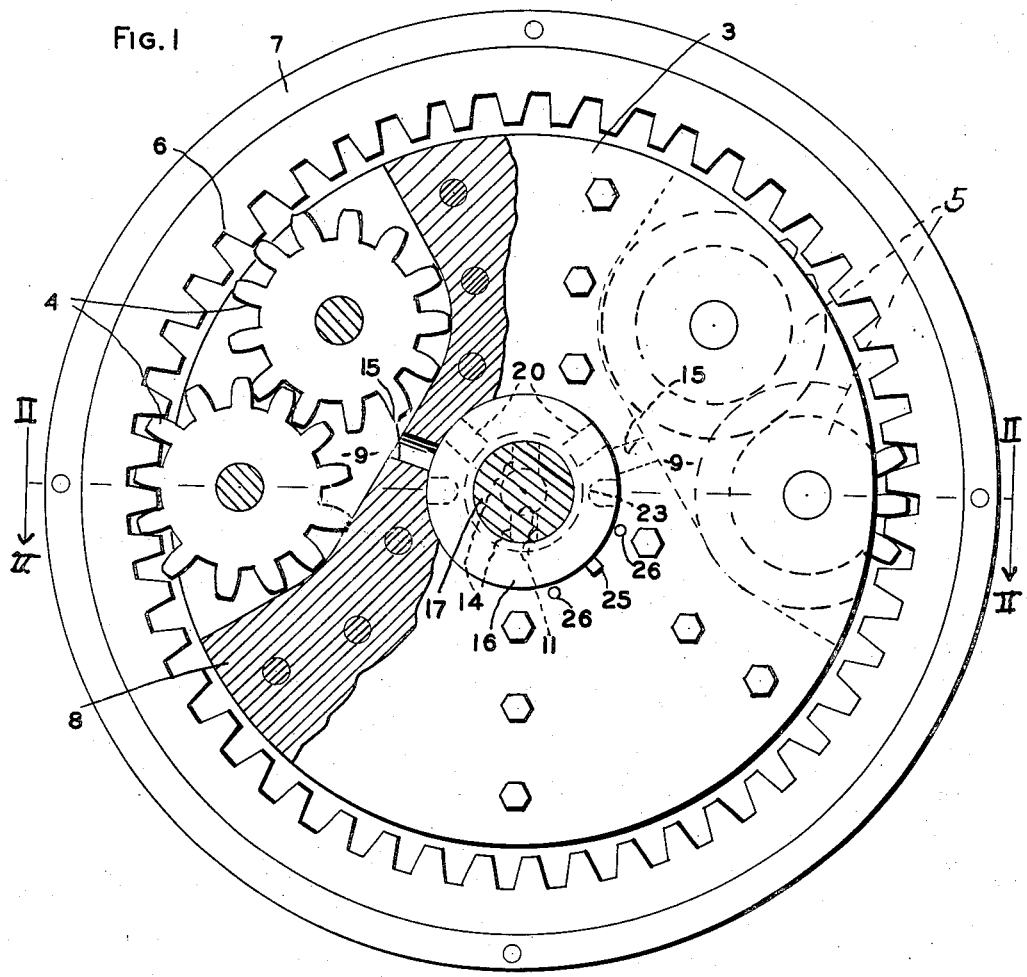
Figure 1 is a face view of the control with the cover plate removed and the control valve and hydraulic pumps or motors in partial section.

In the said drawings, where like reference characters identify corresponding parts in all of the figures, 1 is the frame of a machine of any type needing a control and 2 is a control shaft projecting therefrom, said shaft being relatively heavily loaded and requiring power to rotate the same through a closely controlled arc or degree of swing. The end of the shaft 2 carries a pair of spaced disks 3, one disk being integral with the shaft 2, and the other disk 3 being bolted or removably secured to the first disk 3, and between said disks two pairs of gears 4 and 5 are journalled, one of each pair of gears being spaced on opposite sides of the axis of shaft 2 and each being enmeshed with a ring gear 6 carried by a housing 7 which is secured to the machine base 1.

The pairs of gears 4 and 5 are separated by a spider 8 rigidly secured or carried by the disks 3 and conjointly therewith provide the gears with pressure chambers 9 so that said gears conjointly form hydraulic gear pumps or motors so that power or force can be transmitted from the ring gear 6 or vice versa to the shaft 2. It will also be evident that as the enmeshment between the gear motors and the ring gear is at 180°, said gear motors will concurrently turn in opposite directions when there is movement relative to the ring gear 6.

The end of the shaft 2 is reduced as at 10, and said shaft has an internal fluid bore 11, connected by cross bores 12 to a fluid pressure inlet port 13. To feed fluid under pressure from inlet port 13 to the pressure chambers 9, the passage 11 is adapted to be connected by port 14 in the reduced end 10 of shaft 2 to an inlet port 15 leading into pressure chambers 9, by operation of a cup-shaped control valve 16 which may be journaled in the cover plate 18, its control stem 17 carrying a manual or other suitable operative lever 19.

The cup-shaped control valve 16 is journaled on the reduced end of the shaft 2 and has a tight fit within a bore in the spider 8 and disks 3. Said valve 16 has a pair of ports 20 (Figure 3), which can be selectively brought into register with ports 15 to drive shaft 2 to the right or left, and at the same time one port 20 is feeding fluid under pressure to the pressure chamber 9 of one pair of gears, a port 21 of the valve 16 is exhausting the fluid from the chamber 9 of the other pair of gears, through a passageway 23 in the valve 16 and out through port 22 to the low pressure side of the gear pumps or motors 4—5. As excessive fluid accumulates in the system it may drain away through the opening 24 in the casing.

The operation of the device is as follows: Fluid is maintained at a desired pressure through the inlet 13 but is normally cut off the motors 4—5 by the cup-shaped valve 16, thus there can be no movement of shaft 2 relative to gear 6 as the motors are on opposite sides of the axis of shaft 2. However, if the control valve 16 is turned to the right or left, one or the other of ports 20 opens to a port 15. This feeds fluid under pressure to a high pressure chamber 9 and as such fluid can only escape between the gear teeth to one of the low pressure areas within the casing 7, the whole spider assembly and shaft 2 rotate, since the chamber 9 of the other gear motor is also connected by port 22 in valve 16 to the low pressure area the oil which enters said chamber creates no back pressure on the system. Excess fluid in the system exhausts through port 24 in the casing 7.

If the force holding the valve 16 open is removed the gear motor mechanism 4—5 will automatically float or balance to close the valve 16 since the two motors are on opposite sides of the axis of the shaft 2. It is desirable to limit the extent the valve 16 may be opened in either direction by preventing excessive movement of the control lever 19. To provide such limit, the projecting end of the control valve 16 carries a stop pin 25 which will contact one or the other of a pair of stop pins 26 carried by the outerside of the movable disk 3 (see Figure 1).

From the above description and drawings, it will be apparent that I have produced a construction embodying all of the features of advantage set forth as desirable; and while I have described and illustrated the preferred embodiment, it is to be understood that I reserve the right to all changes within the spirit and scope of the appended claims.

I claim:

1. A fluid control comprising a low pressure housing having an exhaust port, a ring gear secured within the housing, a shaft journalled in the housing, a spider carried by the shaft, a pair of gear motors journaled in the spider and having high pressure chambers within the spider separated by the gears from the low pressure chamber outside the spider and within the housing, one gear of each motor being enmeshed with the ring gear for concurrent opposite rotation of the gear motors, said shaft having an internal ported fluid pressure supply passageway, and a valve on the shaft manually adjustable relative to the housing to open communication between the high pressure chamber of one rotary motor and the pressure supply while the high pressure chamber of the other rotary motor is placed in communication with the low pressure chamber, the resultant rotation of the shaft by the driven motor relative to the non-rotating housing and valve returning the parts to valve-closed position to stop rotation of the shaft relative to the valve and hous- 2. A fluid control comprising a low pressure housing having an exhaust port, a ring gear carried by the housing, a shaft journaled in the housing, a spider carried by the shaft and formed with a pair of cavities, two enmeshed gears journaled to rotate in each cavity with one gear of each pair enmeshed with the ring gear, said pairs of gears each being associated with the spider to provide high pressure chambers within the spider separated by the gears from a low pressure chamber within the housing outside the spider, said shaft having a fluid pressure supply passageway to supply fluid under pressure to the high pressure chambers, and a valve on the shaft manually adjustable relative to the housing to open communication between the high pressure chamber of one rotary motor and the pressure supply while the high pressure chamber of the other rotary motor is placed in communication with the low pressure chamber, the resultant rotation of the shaft by the driven motor relative to the non-rotating housing and valve returning the parts to valve-closed position to stop rotation of the shaft relative to the valve and housing.

3. A fluid power control comprising a ring gear and a driven shaft, said gear and shaft being mounted for relative rotation, a pair of fluid driven gear motors carried by the shaft, each motor having a drive gear positioned on diametrically opposite sides of the shaft, each of said drive gears being enmeshed with the ring gear, each motor also having an idler gear enmeshed with its respective drive gear so that when one motor is driven the other motor is idling, and a manually adjustable valve for concurrently feeding pressure fluid to the high pressure chamber of one motor while the high pressure chamber of the other motor is exhausted, the resultant rotation of the shaft by the drive motor relative to the housing and valve effecting shutting off of the pressure feed valve to stop rotation of the shaft relative to the housing.

References Cited in the file of this patent
UNITED STATES PATENTS
1,341,332   McDonald _____ May 25, 1920